United States Patent [19]
Nishida et al.

[11] Patent Number: 5,936,809
[45] Date of Patent: Aug. 10, 1999

[54] PRECISION ROTATOR

[75] Inventors: Yoshikazu Nishida; Toshiharu Miyago, both of Tokyo, Japan

[73] Assignee: Mitsubishi Denki Kabushiki Kaisha, Tokyo, Japan

[21] Appl. No.: 09/052,939

[22] Filed: Apr. 1, 1998

[30] Foreign Application Priority Data

Aug. 22, 1997 [JP] Japan ............................... P09-226905

[51] Int. Cl.$^6$ ...................................................... G11B 5/53
[52] U.S. Cl. ............................................................ 360/107
[58] Field of Search ..................................... 360/107–109

[56] References Cited

U.S. PATENT DOCUMENTS 5,694,273  12/1997  Takeuchi .................. 360/107

FOREIGN PATENT DOCUMENTS (A)1-140415  6/1989  Japan .

Primary Examiner—Robert S. Tupper

[57] ABSTRACT

Between a manget (11) on the side of an upper drum (2) and a magnet or electromagnet (12) on the side of a lower drum (3), a force of attraction is exerted. With this force of attraction, pre-load of about 2 Kg is applied to a ball bearing (5) in a direction of an axis, to increase stability of rotation of the upper drum (2). Since the upper drum (2) is borne by the axis (4) with one bearing (5), a center of rotation of the upper drum (2) relative to the axis (4) can be changed by changing a balance among forces of attraction of three magnets or electromagnets (12). With this constitution, a precision rotator which allows correction of the center of rotation can be provided.

14 Claims, 4 Drawing Sheets

PRECISION ROTATOR

BACKGROUND OF THE INVENTION

1. Field of the Invention

The present invention relates to a precision rotator used in a magnetic read/write apparatus.

2. Description of the Background Art

FIG. 6 is an elevation with partial section showing a background-art rotating drum device with fixed axis of helical-scan system used in a magnetic read/write apparatus. In this figure shown are a head 1 for reading/writing a signal from/to tape, an upper drum 2 (rotating drum) rotating with the head 1 attached thereto, a lower drum 3 (fixed drum) having a lead groove for guiding the tape, an axis 4 working as a center of rotation of the upper drum 2 and press-fitted to the center of the lower drum 3, a ball bearing 5 with its outer ring press-fitted to the upper drum 3 and its inner ring fit to the axis 4 allowing the upper drum 2 to rotate, an end ring 6 for applying pre-load to the inner ring of the ball bearing 5 in a direction of the axis from above the upper drum 2, a motor drum 7 fixed to the end ring 6 for rotating the upper drum 2 and a rotary transfer unit 8 for transferring the signal from the rotating drum side to the fixed drum side.

FIG. 7 is an elevation with partial section showing a background-art rotating drum device with rotating axis of helical-scan system used in a magnetic read/write apparatus. In this figure shown are the head 1 for reading/writing a signal from/to tape, the upper drum 2 (rotating drum) rotating with the head 1 attached thereto, the lower drum 3 (fixed drum) having the lead groove for guiding the tape, the axis 4 working as a center of rotation of the upper drum 2, the ball bearing 5 with its outer ring press-fitted to the upper drum 3 and its inner ring fit to the axis 4 allowing the upper drum 2 and the axis 4 to rotate, the end ring 6 for applying pre-load to the inner ring of the ball bearing 5 in the direction of the axis, the motor drum 7 fixed to the end ring 6 for rotating the upper drum 2, the rotary transfer unit 8 for transferring the signal from the rotating drum side to the fixed drum side, a terminal transfer unit for transferring the signal between th head 1 and the rotary transfer unit 8 and a damper 10 for suppressing resonance during the rotation of the drum.

An operation of the device of FIG. 6 will be discussed. In the rotating drum device with fixed axis, the signal on the tape wound around the drum is read by the head 1 attached to the upper drum 2 which is rotated by the motor drum 7 and transferred via a lead (not shown) and the rotary transfer unit 8 and through the inside of the fixed lower drum 3 to a circuit. In this signal transfer, two ball bearings 5 are provided on the upper and lower sides of the upper drum 2, which are held between the lower drum 3 and the end ring 6 and to which pre-load is applied by the end ring 6, to stably rotate the upper drum 2.

Next, an operation of the device of FIG. 7 will be discussed. In the rotating drum device with rotating axis, the signal on the tape wound around the drum is read by the head 1 attached to the upper drum 2 which is rotated by the motor drum 7 and transferred via the terminal transfer unit 9 to the rotary transfer unit 8 and further through the inside of the fixed lower drum 3 to the circuit. In this signal transfer, two ball bearings 5 are provided on the upper and lower sides of the lower drum 3, which are held between a flange 15 press-fitted to the upper end portion of the axis 4 and the end ring 6 and to which pre-load is applied by the end ring 6 in the direction of the axis, to stably rotate the upper drum 2. Further, in the drum with rotating axis, since there occurs torsional resonance of the axis, the dumper 10 for attenuating resonance is provided below the motor drum 7.

Having the above constitutions, the background-art rotating head devices have necessity for providing two ball bearings 5 on upper and lower sides of the axis 4 and applying constant pre-load to the ball bearings 5 by the end ring 6 to fix and stably rotate the head 1 about the axis 4. Further, since the axis 4 is hold by the two ball bearings 5 and the center of rotation of the upper drum 2 depends on the positional accuracy of the ball bearings 5, there arises problems that the center of rotation can not be corrected and so on.

SUMMARY OF THE INVENTION

The present invention is directed to a precision rotator for transferring a signal between tape and a head in a magnetic read/write apparatus of helical-scan system. According to a first aspect of the present invention, the precision rotator comprises: a rotating drum and a fixed drum which are paired with each other; an axis fixed to one of the rotating drum and the fixed drum and connected removably to the other through a bearing; driving means for rotating the rotating drum about the axis; a head attached to the rotating drum; first attracting means fixed to a circumferential position around the axis on the side of the rotating drum; and second attracting means fixed to the side of the fixed drum, being opposed to the first attracting means, so that a force of attraction is exerted between the first and second attracting means in a direction of the axis.

According to a second aspect of the present invention, in the precision rotator of the first aspect, the axis is fixed to the fixed drum and bears the rotating drum with the one bearing, and the driving means rotates the rotating drum about the axis with the axis fixed.

According to a third aspect of the present invention, in the precision rotator of the first aspect, the axis is fixed to the rotating drum and borne by the fixed drum with the one bearing, and the driving means rotates the rotating drum in response to rotation of the axis.

According to a fourth aspect of the present invention, in the precision rotator of the third aspect, the first attracting means is fixed to the axis.

According to a fifth aspect of the present invention, in the precision rotator of the first aspect, at least one of the first and second attracting means includes divided attracting means consisting of a plurality of divided attracting portions which are disposed so as to divide a circular surface around the axis, and the divided attracting means is provided so that a balance among the forces of attraction of the plurality of divided attracting portions can be changed.

According to a sixth aspect of the present invention, in the precision rotator of the fifth aspect, the plurality of attracting portions are provided so as to equally divide the circular surface around the axis.

According to a seventh aspect of the present invention, in the precision rotator of the fifth aspect, one of the first and second attracting means is made of magnet or electromagnet and includes the divided attracting means, and the other of the first and second attracting means is made of magnet.

According to an eighth aspect of the present invention, in the precision rotator of the fifth aspect, one of the first and second attracting means is made of magnet and includes the divided attracting means, and the other of the first and second attracting means is made of iron-based material.

According to a ninth aspect of the present invention, in the precision rotator of the fifth aspect, one of the first and second attracting means is made of electromagnet and includes the divided attracting means, and the other of the first and second attracting means is made of iron-based material.

According to a tenth aspect of the present invention, in the precision rotator of the fifth aspect, the first and second means are provided so that a balance of the forces of attraction can be changed in response to switching of tape speed.

According to an eleventh aspect of the present invention, in the precision rotator of the first aspect, a ball bearing is used as the bearing.

According to a twelfth aspect of the present invention, in the precision rotator of the first aspect, a fluid bearing is used as the bearing.

According to a thirteenth aspect of the present invention, in the precision rotator of the first aspect, a sliding bearing is used as the bearing.

According to a fourteenth aspect of the present invention, in the precision rotator of the first aspect, an air bearing is used as the bearing.

In the precision rotator of the first aspect of the present invention, the axis is fixed to one of the rotating drum and the fixed drum and connected removably to the other through one bearing, and therefore, it is possible to change the center of rotation of the rotating drum.

Specifically, in both cases where the axis is fixed to the fixed drum and bears (supports removably) the rotating drum with one bearing and the rotating drum is rotated about the axis rotated by the driving means with the axis fixed in accordance with the second aspect and where the axis is fixed to the rotating drum and borne by the fixed drum with one bearing and the rotating drum is rotated in response to the rotation of the axis by the driving means, the center of rotation of the rotating drum is hold with one bearing and therefore the center of rotation can be changed relatively easily.

Further, in rotation of the rotating drum, by exerting the force of attraction between the first and second attracting means, the pre-load is applied to the bearing in the direction of the axis, to increase the stability of the rotation of the rotating drum.

Furthermore, since only one bearing is used to removably connect the axis to the rotating drum or the fixed drum, simpler and downsized constitution can be achieved.

Moreover, by changing the balance of the force of attraction of the divided attracting means in accordance with the fifth aspect, fine adjustment of the center of rotation of the upper drum is achieved, thereby improving the performance of the product.

When the fine adjustment of the center of rotation of the rotating drum is performed in accordance with the trace of the tape pattern of the head by changing the balance of the force of attraction of the attracting means, the trace along the tape pattern of the head can be achieved even if the tape runs fast, to cut the noise on the monitor which conventionally occurs.

In this case, when a plurality of divided attracting portions are disposed so as to equally divide the circular surface around the axis in accordance with the sixth aspect, it is possible to control the center of rotation of the upper drum with higher precision.

An object of the present invention is to provide a precision rotator which allows correction of the center of rotation.

These and other objects, features, aspects and advantages of the present invention will become more apparent from the following detailed description of the present invention when taken in conjunction with the accompanying drawings.

DESCRIPTION OF THE PREFERRED EMBODIMENTS

The First Preferred Embodiment

Figure 1:
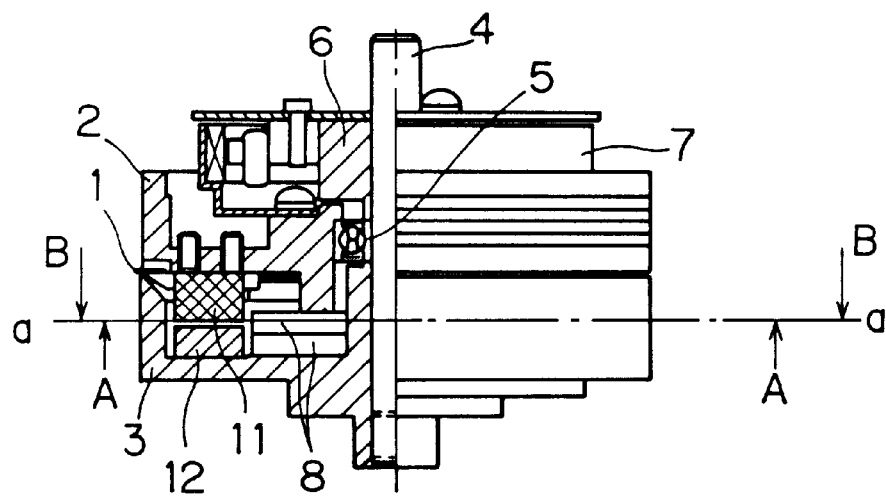
FIG. 1 is an elevation with partial section showing a precision rotator in accordance with a first preferred embodiment of the present invention.
Figure 2:
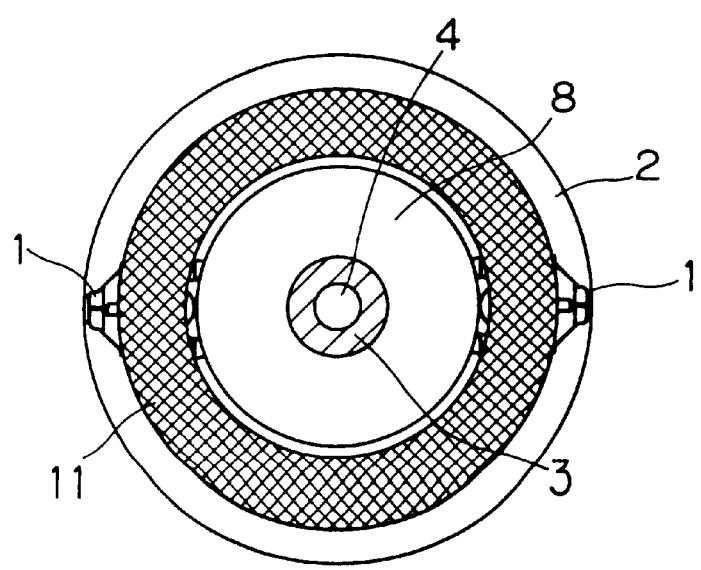
FIG. 2 is a plan view of a—a section of FIG. 1 viewed from the direction of the arrow A.
Figure 3:
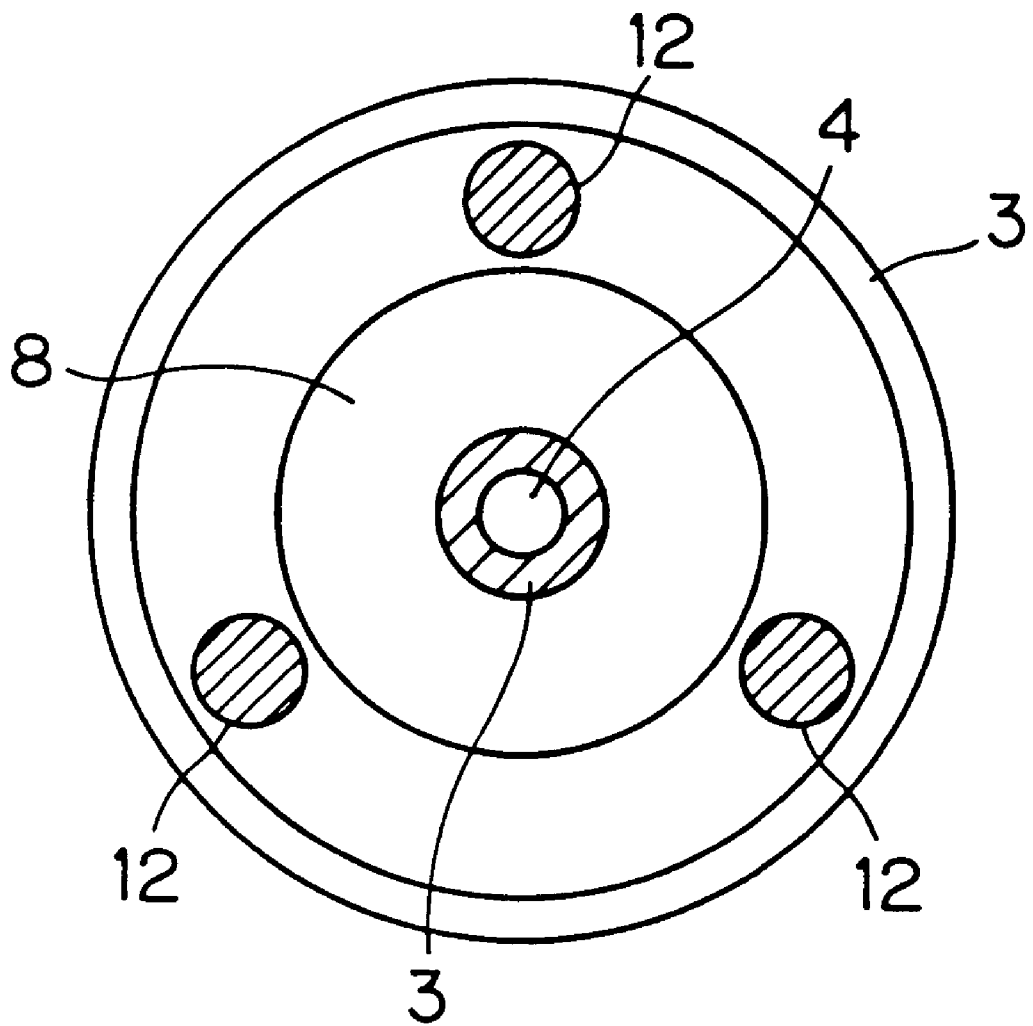
FIG. 3 is a plan view of a—a section of FIG. 1 viewed from the direction of the arrow B.

Now, the first preferred embodiment of the present invention will be specifically discussed with reference to figures. FIG. 1 is an elevation with partial section showing a magnetic read/write apparatus of helical-scan system using a precision rotator of the first preferred embodiment of the present invention. FIG. 2 is a plan view of a—a section of FIG. 1 viewed from the direction of the arrow A, and FIG. 3 is a plan view of a—a section of FIG. 1 viewed from the direction of the arrow B. In these figures shown are the head 1 for reading/writing a signal from/to tape, the upper drum 2 (rotating drum) rotating with the head 1 attached thereto, the lower drum 3 (fixed drum) having the lead groove for guiding the tape, the axis 4 working as a center of rotation of the upper drum 2 and press-fitted to the center of the lower drum 3, the ball bearing 5 with its outer ring press-fitted to the upper drum 3 and its inner ring fit to the axis 4, the motor drum 7 for rotating the upper drum 2 and the end ring 6 for fixing a stator of the motor drum 7.

Magnets or electromagnets 12 are provided and fixed at three positions of the perimeter of the lower drum 3 at an interval of 120 degrees (equally dividing) as shown in FIG. 3 and an annular magnet 11 is provided on a bottom surface of the upper drum 2, being opposed to the magnets or electromagnets 12, as shown in FIG. 2.

In the magnetic read/write apparatus having the above constitution, by rotation of the motor drum 7, the upper drum 2 fixed on the motor drum 7 rotates about the axis 4 and the signal is transferred between the head 1 and the tape for magnetic reading and writing. The upper drum 2 rotates, being borne (supported removably) by the ball bearing 5. At this time, a force of attraction is exerted between the magnet 11 on the upper drum side and the magnets or electromagnets 12 on the lower drum side. The force of attraction applies pre-load of about 2 Kg to the ball bearing 5, to increase stability of rotation of the upper drum 2.

Further, since the upper drum 2 is borne by the axis 4 with one ball bearing 5, it is possible to change a plane posture of the annular magnet 11 opposed to the three magnets or electromagnets 12 by changing the balance among the forces of attraction of the three magnets or electromagnets 12. That results in a change of inclination of the upper drum 2 relative to the axis 4, thereby changing the center of rotation of the drum 2 relative to the axis 4.

Among methods of changing the balance of the three magnets or electromagnets 12 is to change the height of the three magnets or electromagnets 12. For example, the magnets (electromagnets) 12 are pushed up by screws or pins from lower side to control their height.

Another method of changing the balance of the three magnets or electromagnets 12 is to electrically change the respective forces of attraction of the three electromagnets and so on. In this method, it is easy to control the balance among the forces of attraction of the three electromagnets, and if the center of rotation of the upper drum is changed in response to fast-forward or fast-reverse of the tape, the trace angle of the head can be changed, to thereby ensure fast-forward or fast-reverse with little noise on a monitor.

Furthermore, a variety of combinations of the annular magnets 11 and the magnets or electromagnets 12 are possible. For example, there may be a case where the annular magnets 11 is provided on the side of the lower drum 3 and the magnets or electromagnets 12 are provided on the side of the upper drum 2 or a case where an iron-based material is used instead of the annular magnet 11. Though three magnets or electromagnets 12 are disposed so as to divide the circular surface of the drum in this figure, disposition of the magnets or electromagnets is not restricted to this.

For controlling the center of rotation of the upper drum 2 with higher precision, it is better to dispose a plurality of magnets or electromagnets 12 so as to equally divide a circular surface around the axis 4.

Moreover, the same effect can be expected also when a fluid bearing, a sliding bearing or an air bearing is used instead of the ball bearing 5.

The Second Preferred Embodiment

Figure 4:
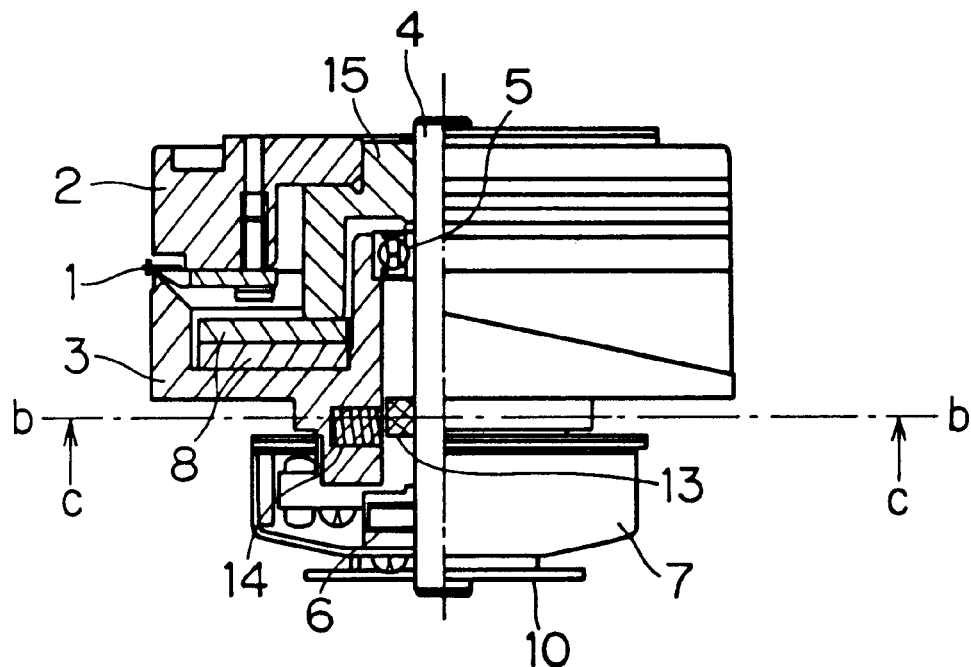
FIG. 4 is an elevation with partial section showing a precision rotator in accordance with a second preferred embodiment of the present invention.
Figure 5:
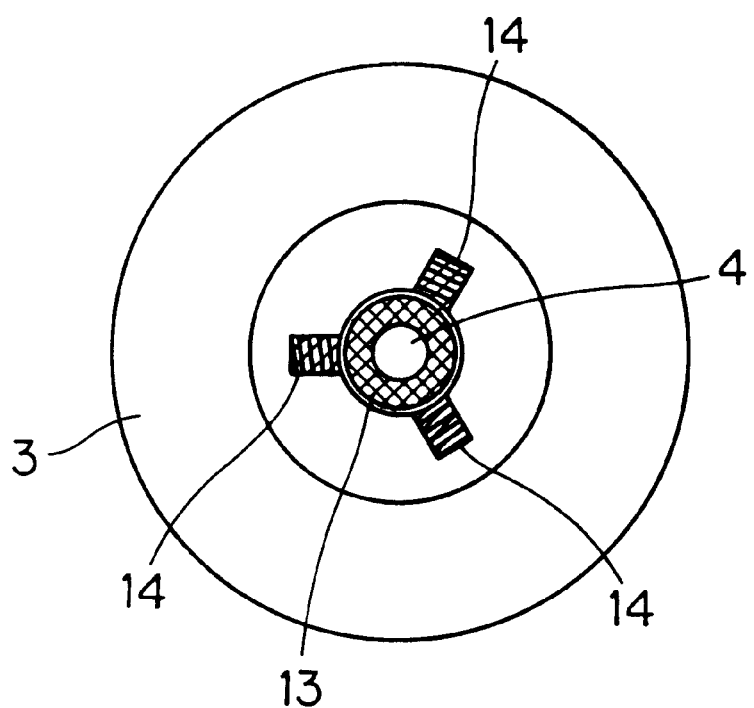
FIG. 5 is a plan view of b—b section of FIG. 4 viewed from the direction of the arrow C.
Figure 6:
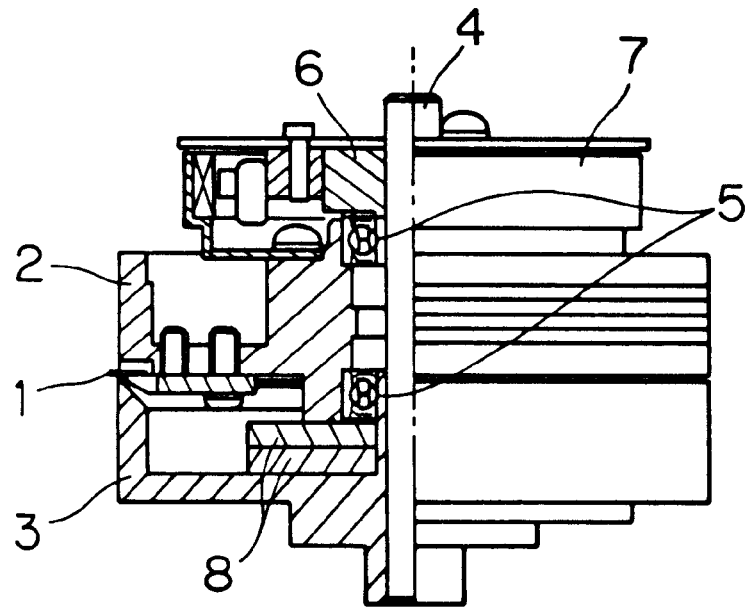
FIG. 6 is an elevation with partial section showing a rotating drum device with fixed axis in the background art.
Figure 7:
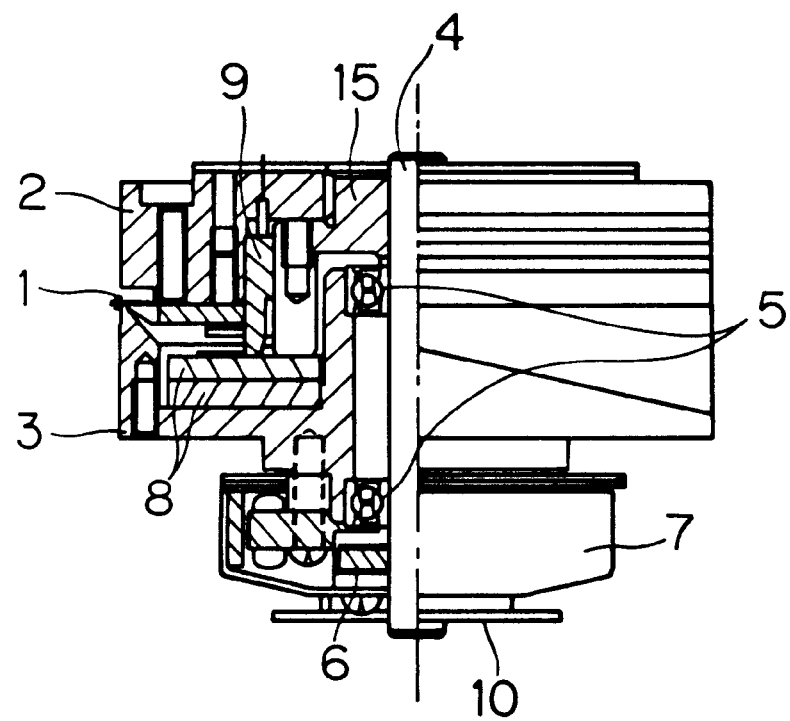
FIG. 7 is an elevation with partial section showing a rotating drum device with rotating axis in the background art.

FIG. 4 is an elevation with partial section showing a magnetic read/write apparatus of helical-scan system using a precision rotator of the second preferred embodiment of the present invention. FIG. 5 is a plan view of b—b section of FIG. 4 viewed from the direction of the arrow C. In these figures shown are the head 1 for reading/writing a signal from/to tape, the upper drum 2 rotating with the head 1 attached thereto, the lower drum 3 having the lead groove for guiding the tape, the axis 4 working as a center of rotation of the upper drum 2 and fixed to the upper drum 2 with a flange 15 interposed, the ball bearing 5 with its outer ring press-fitted to the upper drum 3 and its inner ring fit to the axis 4, the motor drum 7 for rotating the upper drum 2 through the axis 4, the end ring 6 for fixing a rotor of the motor drum 7 and the dumper 10 for attenuating axis resonance. The flange 15 and the end ring 6 hold the ball bearing 5.

Magnets or electromagnets 14 are provided and fixed at three positions of the perimeter of an inner surface of the lower drum 3 substantially perpendicular to the axis 4 at the interval of 120 degrees to equally divide the surface and an annular magnet 13 is fixed around the axis 4. The magnet 13 and the magnets or electromagnets 14 are somewhat offset in a direction of the axis as shown in FIG. 4 (specifically, the magnets or electromagnets 14 arc somewhat displaced relative to the annular magnet 13 in this figure).

In the magnetic read/write apparatus having the above constitution, a force of attraction is exerted between the magnet 13 and the magnet or electromagnet 14 in a direction perpendicular to the axis and in the direction of the axis, to apply the pre-load to the ball bearing 5 in the direction of the axis. Further, by changing the balance among the forces of attraction of the magnets or electromagnets 14, fine adjustment of the center of rotation of the upper drum 2 can be made, and thus the second preferred embodiment achieves the same action and effect as the first preferred embodiment. Furthermore, the magnet 13 and the magnets (electromagnets) 14 are overlapped in the direction of the axis of the upper and lower drums 2 and 3 by fixing the magnet 13 around the axis 4 at almost the same height as the magnets (electromagnets) 14. That reduces the size of the upper and lower drums 2 and 3 in the direction of the axis, to downsize the device on the whole.

While the invention has been shown and described in detail, the foregoing description is in all aspects illustrative and not restrictive. It is therefore understood that numerous modifications and variations can be devised without departing from the scope of the invention.

We claim:

1. A precision rotator for transferring a signal between tape and a head in a magnetic read/write apparatus of helical-scan system, comprising:

a rotating drum and a fixed drum which are paired with each other;

an axis fixed to one of said rotating drum and said fixed drum and connected removably to the other through a bearing;

driving means for rotating said rotating drum about said axis;

a head attached to said rotating drum;

first attracting means fixed to a circumferential position around said axis on the side of said rotating drum; and second attracting means fixed to the side of said fixed drum, being opposed to said first attracting means, so that a force of attraction is exerted between said first and second attracting means in a direction of said axis.

2. The precision rotator of claim 1, wherein said axis is fixed to said fixed drum and bears said rotating drum with said one bearing, and said driving means rotates said rotating drum about said axis with said axis fixed.

3. The precision rotator of claim 1, wherein said axis is fixed to said rotating drum and borne by said fixed drum with said one bearing, and said driving means rotates said rotating drum in response to rotation of said axis.

4. The precision rotator of claim 3, wherein said first attracting means is fixed to said axis.

5. The precision rotator of claim 1, wherein at least one of said first and second attracting means includes divided attracting means consisting of a plurality of divided attracting portions which are disposed so as to divide a circular surface around said axis, and said divided attracting means is provided so that a balance among said forces of attraction of said plurality of divided attracting portions can be changed.

6. The precision rotator of claim 5, wherein said plurality of attracting portions are provided so as to equally divide said circular surface around said axis.

7. The precision rotator of claim 5, wherein one of said first and second attracting means is made of magnet or electromagnet and includes said divided attracting means, and the other of said first and second attracting means is made of magnet.

8. The precision rotator of claim 5, wherein one of said first and second attracting means is made of magnet and includes said divided attracting means, and the other of said first and second attracting means is made of iron-based material.

9. The precision rotator of claim 5, wherein one of said first and second attracting means is made of electromagnet and includes said divided attracting means, and the other of said first and second attracting means is made of iron-based material.

10. The precision rotator of claim 5, wherein said first and second means are provided so that a balance of said forces of attraction can be changed in response to switching of tape speed.

11. The precision rotator of claim 1, wherein a ball bearing is used as said bearing.

12. The precision rotator of claim 1, wherein a fluid bearing is used as said bearing.

13. The precision rotator of claim 1, wherein a sliding bearing is used as said bearing.

14. The precision rotator of claim 1, wherein an air bearing is used as said bearing.

* * * * *